(12) United States Patent
Jiao

(10) Patent No.: US 12,732,698 B1
(45) Date of Patent: Sep. 8, 2026

(54) IMAGE SENSOR ANTI-SHAKE APPARATUS

(71) Applicant: Chengdu Dinxin Precision Control Tech Co., Ltd., Chengdu (CN)

(72) Inventor: Zhitao Jiao, Chengdu (CN)

(73) Assignee: Chengdu Dinxin Precision Control Tech Co., Ltd., Chengdu (CN)

( * ) Notice: Subject to any disclaimer, the term of this patent is extended or adjusted under 35 U.S.C. 154(b) by 0 days.

(21) Appl. No.: 19/635,711

(22) Filed: Mar. 31, 2026

(30) Foreign Application Priority Data

Dec. 31, 2025 (CN) ......................... 202522831485.5

(51) Int. Cl.
*H04N 23/68* (2023.01)
*H04N 23/54* (2023.01)

(52) U.S. Cl.
CPC ........... *H04N 23/687* (2023.01); *H04N 23/54* (2023.01)

(58) Field of Classification Search
CPC ............................ H04N 23/687; H04N 23/54
See application file for complete search history.

(56) References Cited

U.S. PATENT DOCUMENTS

| | | | | |
|---|---|---|---|---|
| 8,982,464 | B2 * | 3/2015 | Chan | G02B 27/646 359/554 |
| 10,247,954 | B2 * | 4/2019 | Ito | G02B 7/28 |
| 12,645,094 | B1 * | 6/2026 | Jiao | G02B 27/646 |
| 2015/0365568 | A1 * | 12/2015 | Topliss | G02B 7/08 348/360 |
| 2019/0212632 | A1 * | 7/2019 | Miller | G03B 3/10 |
| 2024/0147072 | A1 * | 5/2024 | Kwon | G02B 27/646 |
| 2025/0392819 | A1 * | 12/2025 | Oh | H04N 23/57 |
| 2026/0056446 | A1 * | 2/2026 | Lee | G03B 13/36 |

FOREIGN PATENT DOCUMENTS

| | | | |
|---|---|---|---|
| CN | 218824962 | U | 4/2023 |
| CN | 219202049 | U | 6/2023 |
| CN | 219893389 | U | 10/2023 |
| CN | 221127396 | U | 6/2024 |
| CN | 221926802 | U | 10/2024 |
| CN | 223142036 | U | 7/2025 |
| CN | 223259979 | U | 8/2025 |
| CN | 223597984 | U | 11/2025 |
| CN | 223598012 | U | 11/2025 |
| CN | 223679435 | U | 12/2025 |
| CN | 223728057 | U | 12/2025 |

* cited by examiner

*Primary Examiner* — Shahbaz Nazrul
(74) *Attorney, Agent, or Firm* — Fideli Law PLLC; Qiang Li

(57) ABSTRACT

The present disclosure relates to an image sensor anti-shake apparatus, comprising: a base provided with a first horizontal driving magnet and first up-down driving magnets; a cover plate fixedly connected to the base, the cover plate provided with a second horizontal driving magnet corresponding to the first horizontal driving magnet and second up-down driving magnets corresponding to the first up-down driving magnets; a movable plate disposed between the base and the cover plate and movably connected to the base via a connecting assembly, the movable plate provided with a horizontal driving coil and up-down driving coils; a detection assembly configured to detect movement information of the movable plate; and an image sensor module disposed on the movable plate. The present disclosure has the advantages of a compact and small structure, high control accuracy, and simple assembly and debugging.

8 Claims, 2 Drawing Sheets

IMAGE SENSOR ANTI-SHAKE APPARATUS

CROSS-REFERENCE TO RELATED APPLICATIONS

This application claims the benefit of priority of Chinese application number 202522831485.5, filed on Dec. 31, 2025. The entire contents of the above-mentioned applications are incorporated herein by reference.

TECHNICAL FIELD

The present disclosure relates to the technical field of image anti-shake, and specifically to an image sensor anti-shake apparatus.

BACKGROUND

When an imaging device observes a distant target, the lens has a long focal length and a narrow image field of view, so even a slight jitter of the body will cause severe jittering of the image. During handheld shooting, hand jittering will also cause image jittering. For this reason, an anti-shake apparatus can be used to implement drive control on the image sensor to eliminate image jittering. However, existing anti-shake apparatuses have certain technical problems: in some, the driving assembly, CMOS, and controller are deployed separately, resulting in a large volume and high cost; in others, a driving magnet is only disposed on one side of the driving coil, resulting in low driving efficiency.

SUMMARY

In order to solve the above problems, the present application provides an image sensor anti-shake apparatus, which uses three sets of driving coils to achieve anti-shake driving, integrates the three sets of driving coils, a sensing circuit, and the image sensor on a movable plate, and integrates driving magnets on both sides of the driving coils onto a base and a cover plate, thereby forming a "sandwich" structure that can be quickly assembled. This solution has the following advantages: three-coil driving is adopted, resulting in high anti-shake accuracy and flexible control; the anti-shake control and the CMOS are integrated, resulting in high integration and a compact appearance; driving magnets are provided on both sides of the driving coils, resulting in high driving efficiency; and the "sandwich" type clamping structure features high modularity and convenient assembly.

The objective of the present disclosure is achieved through the following technical solution: An image sensor anti-shake apparatus, comprising:

a base, on which first horizontal driving magnets and first up-down driving magnets are disposed;

a cover plate, fixedly connected to the base; wherein the cover plate is provided with a second horizontal driving magnet corresponding in position to the first horizontal driving magnet and second up-down driving magnets corresponding in position to the first up-down driving magnets;

a movable plate, disposed between the base and the cover plate, and movably connected to the base via a connecting assembly; wherein the movable plate is provided with a horizontal driving coil and up-down driving coils, the position of the horizontal driving coil is respectively opposite to the first horizontal driving magnet and the second horizontal driving magnet, and the positions of the up-down driving coils are respectively opposite to the first up-down driving magnets and the second up-down driving magnets;

a detection assembly, disposed on the movable plate, and configured to detect movement information of the movable plate;

an image sensor module, disposed on the movable plate;

wherein the number of the up-down driving coils is set to two, and the two up-down driving coils are respectively disposed on left and right sides of the movable plate; and the number of the first up-down driving magnets and the second up-down driving magnets are each set to two, with positions corresponding respectively to the two up-down driving coils.

Further, the detection assembly comprises a gyroscope sensor, a horizontal detection Hall element, and up-down detection Hall elements disposed on the movable plate, wherein the horizontal detection Hall element is disposed inside the horizontal driving coil, and the up-down detection Hall elements are disposed inside the up-down driving coils.

As another solution, the detection assembly comprises a gyroscope sensor, a horizontal detection Hall element, and up-down detection Hall elements disposed on the movable plate; the horizontal detection Hall element is disposed on a side of the movable plate facing away from the horizontal driving coil, and its position corresponds to a hollow portion of the horizontal driving coil; and the up-down detection Hall elements are disposed on a side of the movable plate facing away from the up-down driving coils, and their positions correspond to hollow portions of the up-down driving coils.

The two up-down driving coils are respectively disposed on left and right sides of one end of the movable plate, and the horizontal driving coil is disposed in a middle part of another end of the movable plate; the two up-down driving coils can move up and down synchronously relative to the two first up-down driving magnets and the two second up-down driving magnets, thereby driving the movable plate to move up and down; or, the two up-down driving coils can respectively move differentially relative to the corresponding first up-down driving magnets and second up-down driving magnets in a differential manner, thereby driving the movable plate to rotate.

An attracting surface of the base is provided with a plurality of ball grooves, balls are installed in the ball grooves, and the balls partially protrude from the attracting surface of the base, such that the base and the movable plate are isolated by the balls.

The connecting assembly comprises a first attracting magnet disposed on the attracting surface of the base and an iron piece disposed on an attracting surface of the movable plate at a position opposite to the first attracting magnet.

The cover plate is provided with a second opening at a position opposite to the image sensor module.

The movable plate is a main control circuit board, and the horizontal driving coil, the up-down driving coils, the horizontal detection Hall element, the up-down detection Hall elements, and the gyroscope sensor are all electrically connected to the main control circuit board; and the main control circuit board is connected to a control circuit board of an external imaging device via a flexible flat cable.

BRIEF DESCRIPTION OF THE DRAWINGS

The drawings described herein are provided for further understanding of the present application and constitute a part of the present application. The schematic embodiments of the present application and their descriptions are used to explain the present application and do not constitute a limitation on the present application. In the drawings, the same reference numerals indicate the same components. Among them.

Figure 1:
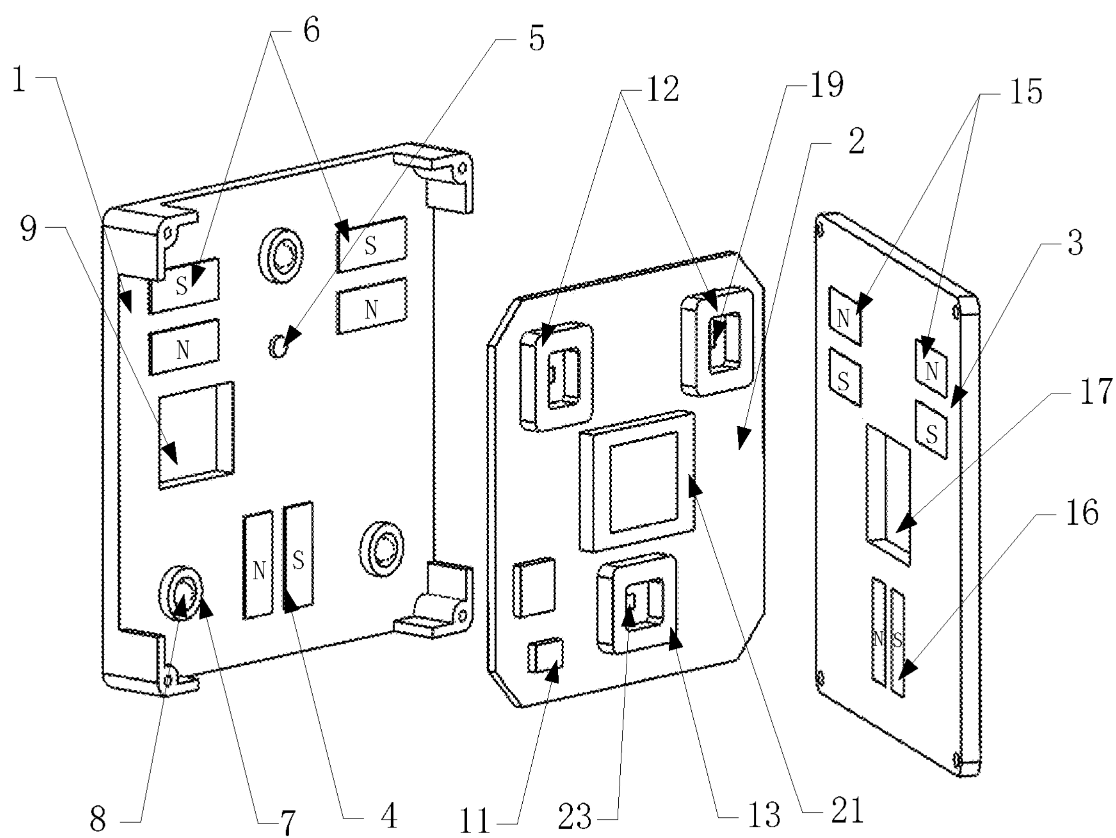
FIG. 1 is an exploded schematic view of the present disclosure from a first perspective.

The reference numerals in the above drawings are: 1-base, 2-movable plate, 3-cover plate, 4-first horizontal driving magnet, 5-first attracting magnet, 6-first up-down driving magnets, 7-ball groove, 8-ball, 9-first opening, 10-iron piece, 11-gyroscope sensor, 12-up-down driving coil, 13-horizontal driving coil, 14-magnetic yoke piece, 15-second up-down driving magnets, 16-second horizontal driving magnet, 17-second opening, 19-up-down detection Hall element, 21-image sensor module, 23-horizontal detection Hall element.

DETAILED DESCRIPTION

In order to enable those skilled in the art to better understand the solutions of the present application, the technical solutions in the embodiments of the present application will be clearly and completely described below with reference to the accompanying drawings in the embodiments of the present application. Obviously, the described embodiments are only a part of the embodiments of the present application, and not all of the embodiments.

Embodiment 1

As shown in FIG. 1, this embodiment discloses an image sensor anti-shake apparatus, comprising: a base 1, a cover plate 3, a movable plate 2, a detection assembly, and an image sensor module 21. Among them, the cover plate 3 is fixedly connected to the base 1 through screws, and the movable plate 2 is disposed between the base 1 and the cover plate 3, and is movably connected to the base 1 through a connecting assembly.

The base 1 is provided with a first horizontal driving magnet 4 and first up-down driving magnets 6, and the cover plate 3 is provided with a second horizontal driving magnet 16 and second up-down driving magnets 15. Correspondingly, the movable plate 2 is provided with a horizontal driving coil 13 and up-down driving coils 12, the position of the horizontal driving coil 13 is opposite to the first horizontal driving magnet 4 and the second horizontal driving magnet 16 respectively, while the positions of the up-down driving coils 12 are respectively opposite to the first up-down driving magnets 6 and the second up-down driving magnets 15. The horizontal driving coil 13 and the up-down driving coils 12 can be fixed on the movable plate 2 by means of adhesive bonding.

Through the above structure, the first horizontal driving magnet 4, the second horizontal driving magnet 16, and the horizontal driving coil 13 collectively form a horizontal driving mechanism; when the horizontal driving coil 13 is energized, the movable plate 2 can be moved left and right by driving the first horizontal driving magnet 4 and the second horizontal driving magnet 16. Correspondingly, the first up-down driving magnets 6, the second up-down driving magnets 15, and the up-down driving coils 12 collectively form an up-down driving mechanism; when the up-down driving coils 12 are energized, the movable plate 2 can be moved up and down by driving the first up-down driving magnets 6 and the second up-down driving magnets 15. During specific implementation, coils with a length of 10 mm, a width of 8 mm, and a thickness of 1.4 mm can be selected for both the horizontal driving coil 13 and the up-down driving coils 12.

In addition, during specific implementation, the number of up-down driving coils 12 is set to two, and the two up-down driving coils 12 are respectively disposed on the lower left and right sides of the movable plate 2, while the horizontal driving coil 13 is single and disposed at the upper middle position of the movable plate 2, as shown in FIG. 1. Correspondingly, the number of the first up-down driving magnets 6 and the number of the second up-down driving magnets 15 are each also set to two, with positions corresponding respectively to the two up-down driving coils 12, that is, the positions of the two first up-down driving magnets 6 are opposite to the positions of the two up-down driving coils 12, and the positions of the two second up-down driving magnets 15 also correspond to the positions of the two up-down driving coils 12. Through the above structure, two up-down driving mechanisms distributed on the left and right are formed between the base 1, the movable plate 2, and the cover plate 3, that is, one of the up-down driving coils 12 and the opposite first up-down driving magnets 6 and second up-down driving magnets 15 constitute one up-down driving mechanism, and the other up-down driving coil 12 and the opposite first up-down driving magnets 6 and second up-down driving magnets 15 constitute the other up-down driving mechanism. The driving capability of the up-down axis can be improved by providing two up-down driving mechanisms. In addition, through the above design, when the two up-down driving coils 12 move up and down synchronously relative to the two first up-down driving magnets 6 and the two second up-down driving magnets 15, the movable plate 2 can be driven to move up and down; that is to say, when the driving forces of the two up-down driving mechanisms are synchronized up and down, the movable plate 2 moves up and down. Alternatively, when the two up-down driving coils 12 respectively move relative to the corresponding first up-down driving magnets 6 and second up-down driving magnets 15 in a differential manner, the movable plate 2 can be made to rotate; that is to say, when the driving forces of the two up-down driving mechanisms are unsynchronized, for example, when the driving force of one up-down driving mechanism is directed upward and the driving force of the other up-down driving mechanism is directed downward, the movable plate 2 will rotate.

In this embodiment, the driving coils are disposed on the intermediate movable plate, and simultaneously driving magnets are respectively disposed on the base 1 and the cover plate 3 on both sides of the movable plate, that is, driving magnets are provided on both sides of the driving coils, which significantly increases the magnetic field strength at the driving coil location, thereby improving the driving efficiency of the movable plate and enhancing the anti-shake effect. In addition, the design of the three driving coils can improve control precision, and the "sandwich" structure where the base 1 and the cover plate 3 clamp the movable plate 2 facilitates assembly.

Figure 2:
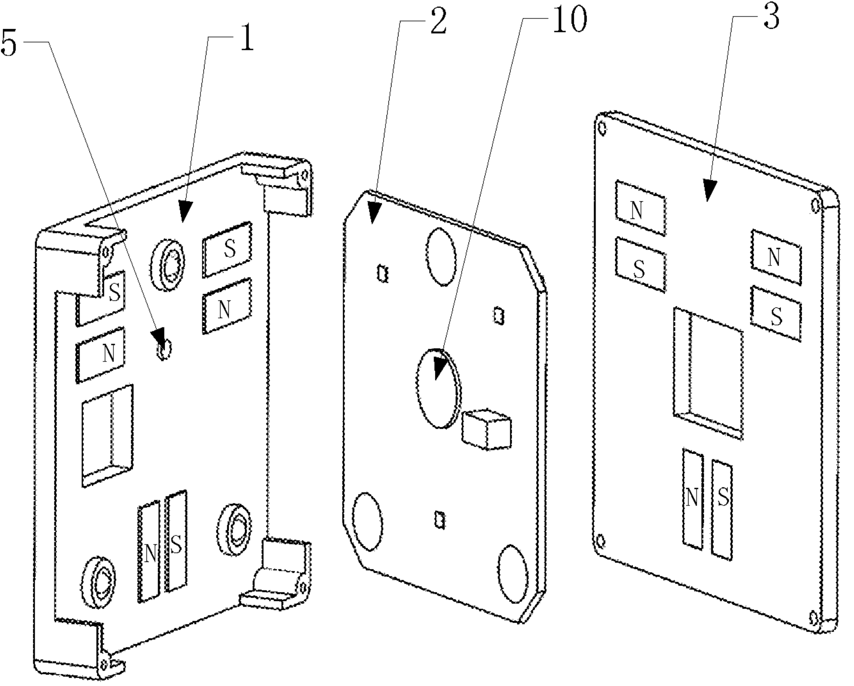
FIG. 2 is an exploded schematic view of the present disclosure from a second perspective.

Additionally, during specific implementation, the first horizontal driving magnet 4, the second horizontal driving magnet 16, and each first up-down driving magnets 6 and second up-down driving magnets 15 are all composed of two magnet pieces. Taking the two first up-down driving magnets 6 as an example, each first up-down driving magnets 6 is composed of two magnet pieces, and the two magnet pieces are distributed up and down, wherein the N pole of one magnet piece is embedded in the base 1 and the S pole faces outward, and the S pole of the other magnet piece is embedded in the base 1 and the N pole faces outward; the N pole and S pole of the two magnet pieces of the two first up-down driving magnets 6 need to correspond. Correspondingly, the magnet pieces constituting the two second up-down driving magnets 15 are also distributed up and down, but their polarities are opposite to those of the two first up-down driving magnets 6, as shown in FIGS. 1 and 2.

In addition, the first horizontal driving magnet 4 is also composed of two magnet pieces, and the two magnet pieces are distributed left and right, wherein the N pole of one magnet piece is embedded in the base 1 and the S pole faces outward; the S pole of the other magnet piece is embedded in the base 1 and the N pole faces outward. The two magnet pieces constituting the second horizontal driving magnet 16 are also distributed left and right, but their polarities are opposite to those of the first horizontal driving magnet 4, as shown in FIGS. 1 and 2.

Through the above arrangement of the driving magnets, the double-sided magnets spliced from two magnet pieces have stronger magnetism and better driving effects. During specific implementation, the two magnet pieces constituting the driving magnet may be distributed closely adjacent to each other, or may be distributed at an interval; as shown in FIG. 1, an interval distribution of the two magnet pieces can increase their driving stroke.

Figure 4:
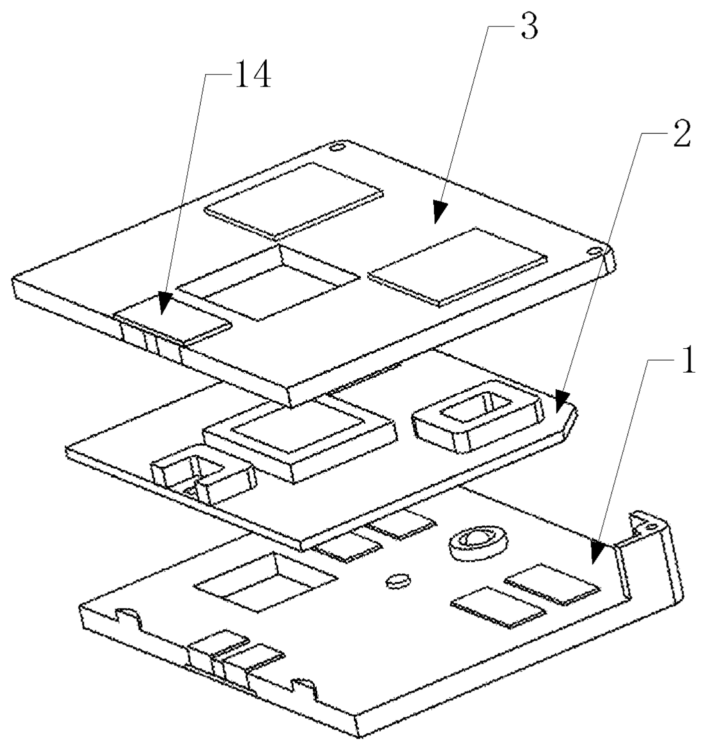
FIG. 4 is a cross-sectional schematic view of the present disclosure.

In addition, a plurality of magnetic yoke pieces 14 may also be disposed on the sides of the cover plate 3 and the base 1 facing away from the movable plate 2, and the number and positions of the magnetic yoke pieces 14 correspond with the positions and number of the first up-down driving magnets 6, the second up-down driving magnets 15, the first horizontal driving magnet 4, and the second horizontal driving magnet 16, as shown in FIG. 4. By providing the magnetic yoke pieces 14, the magnetism inside the apparatus can be made stronger, and the magnetic field can be shielded from external interference.

The image sensor module 21 is disposed on the movable plate 2; correspondingly, the cover plate 3 is provided with a second opening 17 at a position opposite to the image sensor module 21, and the image sensor module 21 can acquire images through the second opening 17. The image sensor module 21 may be a CMOS visible light sensor module, an infrared image sensor module, a thermal imaging detector module, or other types of image sensor modules. In addition, the image sensor module 21 can also be replaced with a lens, in which case the apparatus can be applied to a telescope.

Figure 3:
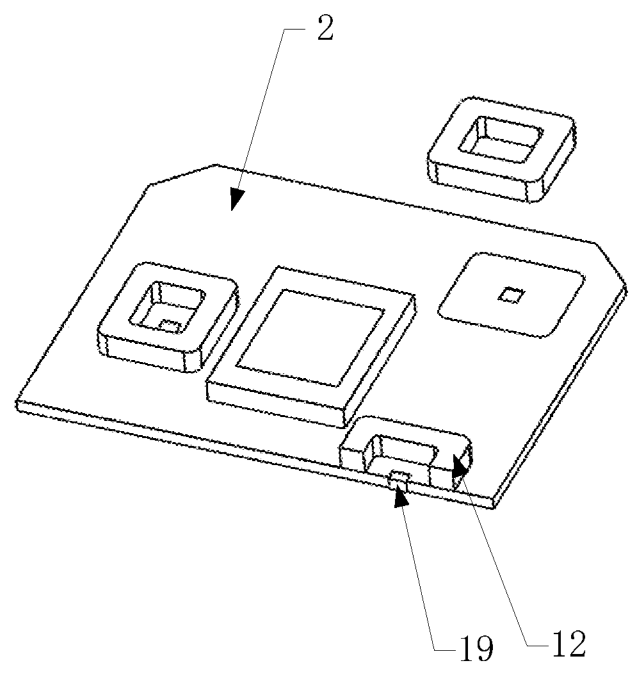
FIG. 3 is a schematic view of the arrangement of the driving coils and detection Hall elements of the present disclosure.

The detection assembly is disposed on the movable plate 2, and is configured to detect motion data of the movable plate 2. Specifically, the detection assembly comprises a gyroscope sensor 11, a horizontal detection Hall element 23, and up-down detection Hall elements 19 disposed on the movable plate 2. Among them, the number of the horizontal detection Hall element 23 is one, which is disposed inside the horizontal driving coil 13; the number of the up-down detection Hall elements 19 is two, which are respectively disposed inside the two up-down driving coils 12, as shown in FIG. 3.

Because the position of the horizontal driving coil 13 is opposite to the first horizontal driving magnet 4 and the second horizontal driving magnet 16 respectively, the position of the horizontal detection Hall element 23 is opposite to the positions of the first horizontal driving magnet 4 and the second horizontal driving magnet 16, at which time the horizontal detection Hall element 23 detects its position information relative to the first horizontal driving magnet 4 and the second horizontal driving magnet 16 as a control feedback amount.

Correspondingly, because the positions of the two up-down driving coils 12 are respectively opposite to the two first up-down driving magnets 6 and the two second up-down driving magnets 15, the positions of the two up-down detection Hall elements 19 are respectively opposite to the positions of the two first up-down driving magnets 6 and the two second up-down driving magnets 15, at which time the two up-down detection Hall elements 19 detect their position information relative to the corresponding first up-down driving magnets 6 and second up-down driving magnets 15 as control feedback amounts.

By disposing the Hall elements inside the driving coils, the structure is compact, and corresponding horizontal sensing magnets and up-down sensing magnets may be omitted, thereby reducing space occupation.

The gyroscope sensor 11 is used to detect jitter information of the entire anti-shake apparatus. During specific implementation, an ICM20602 gyroscope sensor is adopted for the gyroscope sensor 11, and SS49E Hall elements are adopted for both the horizontal detection Hall element 23 and the up-down detection Hall elements 19.

As shown in FIG. 1, the connecting assembly comprises a first attracting magnet 5 disposed on the attracting surface of the base 1 and an iron piece 10 disposed on the attracting surface of the movable plate 2 at a position opposite to the first attracting magnet 5. Through the mutual attractive force between the first attracting magnet 5 and the iron piece 10, an attractive force drawing the base 1 and the movable plate 2 closer to each other is provided, preventing the base 1 and the movable plate 2 from moving away from each other. Specifically, the first attracting magnet 5 can be disposed at the center position of the base 1, and the position of the iron piece 10 corresponds thereto; of course, there can also be a plurality of first attracting magnets 5, for example, four first attracting magnets 5 are provided and located respectively at the four corner positions of the base 1, and the number and positions of the iron pieces 10 correspond with the first attracting magnets 5.

In order to prevent the base 1 and the movable plate 2 from being attracted and closely attached to each other such that the movable plate 2 cannot move, a plurality of ball grooves 7 are provided on the attracting surface of the base 1, balls 8 are installed in the ball grooves 7, and the balls 8 partially protrude from the attracting surface of the base 1, therefore the base 1 and the movable plate 2 are isolated by the balls 8. During implementation, a plurality of ball grooves 7 can be provided, for example, three are provided, and the three ball grooves 7 are distributed in a triangle. A ball 8 is disposed in each ball groove 7, and the movable plate 2 is supported by the plurality of balls 8, making the movable plate 2 more stable. The positions of the ball grooves 7 can be set according to the situation, as long as the base 1 and the movable plate 2 are kept stable. During implementation, a ball contact area corresponding in position to the balls 8 can also be provided on the attracting surface of the movable plate 2, and this area can be configured as a smooth concave surface.

In this embodiment, by disposing the balls 8 between the base 1 and the movable plate 2, the base 1 and the movable plate 2 can move purely in a plane and have minimal resistance. The first attracting magnet 5 and the iron piece 10 are disposed between the base 1 and the movable plate 2, and can cause the base 1 and the movable plate 2 to be attracted together while being isolated by the balls 8 through the mutual attraction of opposite magnetic poles on both sides. The ball grooves 7 can limit the balls 8 to prevent the balls 8 from falling.

During specific implementation, the movable plate 2 is a main control circuit board, and the horizontal driving coil 13, the two up-down driving coils 12, the horizontal detection Hall element 23, the two up-down detection Hall elements 19, the gyroscope sensor 11, and the image sensor module 21 are all electrically connected to the main control circuit board. Signals are transmitted to the main control circuit board, and the main control circuit board is connected to a control circuit board of an external imaging device via a flexible flat cable. The main control circuit board can adopt GD32L233 as a processor. During specific implementation, a first opening 9 may be provided on the base 1, and the flexible flat cable passes through the first opening 9 to connect with the control circuit board of the external imaging device. Wherein, the imaging device is a handheld night vision device, an electronic telescope, or an electronic eyepiece, that is, the image sensor anti-shake apparatus of this embodiment can be applied in the fields of handheld night vision devices, electronic telescopes, or electronic eyepieces.

In use, the image sensor anti-shake apparatus of this embodiment is installed in an imaging device such as a handheld night vision device, an electronic telescope, or an electronic eyepiece. When the imaging device experiences jitter, the gyroscope sensor 11 detects jitter data and uses this jitter data as a target amount, and the up-down detection Hall elements 19 detect movement distance data between themselves and the first up-down driving magnets 6 and the second up-down driving magnets 15 as control feedback amounts. The above feedback amounts and target amount are input into a feedback control algorithm to calculate a control output amount, causing the up-down driving coils 12 to move relative to the first up-down driving magnets 6 and the second up-down driving magnets 15, such that the movable plate 2 makes a corresponding up-down movement or deflection. At the same time, the horizontal detection Hall element 23 detects movement distance data between itself and the first horizontal driving magnet 4 and the second horizontal driving magnet 16 as a control feedback amount, and this feedback amount and the target amount are input into the feedback control algorithm to calculate a control output amount, causing the horizontal driving coil 13 to horizontally offset relative to the first horizontal driving magnet 4 and the second horizontal driving magnet 16, such that the movable plate 2 makes a corresponding left-right translation, thereby offsetting the impact on the image caused by lens jitter.

Embodiment 2

The image sensor anti-shake apparatus of this embodiment is basically the same as Embodiment 1, and the difference lies in that the arrangement positions of the horizontal detection Hall element 23 and the up-down detection Hall elements 19 in this embodiment are different from those in Embodiment 1. Specifically, the horizontal detection Hall element 23 of this embodiment is disposed on a side of the movable plate 2 facing away from the horizontal driving coil 13, and its position corresponds to a hollow portion of the horizontal driving coil 13; the up-down detection Hall elements 19 are disposed on a side of the movable plate 2 facing away from the up-down driving coils 12, and their positions correspond to hollow portions of the up-down driving coils 12. In this embodiment, by disposing the Hall elements and the driving coils on different surfaces of the movable plate 2, interference of the driving coils on the Hall elements can be reduced.

Embodiment 3

The image sensor anti-shake apparatus of this embodiment is basically the same as Embodiment 1, and the difference lies in that the image sensor anti-shake apparatus of this embodiment further comprises a main control circuit board. In addition, the movable plate 2 of this embodiment is a detection circuit board, the horizontal driving coil 13, the two up-down driving coils 12, the horizontal detection Hall element 23, the two up-down detection Hall elements 19, the gyroscope sensor 11, and the image sensor module 21 are all electrically connected to the detection circuit board, and the detection circuit board is connected to the main control circuit board via a flexible flat cable, and the main control circuit board is connected to a control circuit board of an external imaging device via a flexible flat cable.

It should be noted that all features disclosed in this specification, or steps in all methods or processes disclosed, may be combined in any way, except for mutually exclusive features and/or steps.

In addition, the above specific embodiments are exemplary, and those skilled in the art can come up with various solutions under the inspiration of the disclosure of the present disclosure, and these solutions also belong to the disclosure scope of the present disclosure and fall within the protection scope of the present disclosure. Those skilled in the art should understand that the specification of the present disclosure and its accompanying drawings are illustrative and do not constitute a limitation on the claims. The protection scope of the present disclosure is defined by the claims and their equivalents.

What is claimed is:

1. An image sensor anti-shake apparatus, comprising:

a base (1) provided with a first horizontal driving magnet (4) and first up-down driving magnets (6);

a cover plate (3) fixedly connected to the base (1), wherein the cover plate (3) is provided with a second horizontal driving magnet (16) corresponding in position to the first horizontal driving magnet (4) and second up-down driving magnets (15) corresponding in position to the first up-down driving magnets (6);

a movable plate (2) disposed between the base (1) and the cover plate (3) and movably connected to the base (1) via a connecting assembly, wherein the movable plate (2) is provided with a horizontal driving coil (13) and up-down driving coils (12), the position of the horizontal driving coil (13) is opposite to the first horizontal driving magnet (4) and the second horizontal driving magnet (16) respectively, and the positions of the up-down driving coils (12) are opposite to the first up-down driving magnets (6) and the second up-down driving magnets (15) respectively;

a detection assembly disposed on the movable plate (2) and configured to detect motion data of the movable plate (2); and an image sensor module (21) disposed on the movable plate (2);

wherein the number of the up-down driving coils (12) is set to two, and the two up-down driving coils (12) are respectively disposed on left and right sides of the movable plate (2); and the number of the first up-down driving magnets (6) and the number of the second up-down driving magnets (15) are each set to two, with positions corresponding respectively to the two up-down driving coils (12).

2. The image sensor anti-shake apparatus according to claim 1, wherein the detection assembly comprises a gyroscope sensor (11), a horizontal detection Hall element (23), and up-down detection Hall elements (19), all disposed on the movable plate (2), wherein the horizontal detection Hall element (23) is disposed inside the horizontal driving coil (13), and the up-down detection Hall elements (19) are disposed inside the up-down driving coils (12).

3. The image sensor anti-shake apparatus according to claim 1, wherein the detection assembly comprises a gyroscope sensor (11), a horizontal detection Hall element (23), and up-down detection Hall elements (19), all disposed on the movable plate (2); the horizontal detection Hall element (23) is disposed on a side of the movable plate (2) facing away from the horizontal driving coil (13), and its position corresponds to a hollow portion of the horizontal driving coil (13); and the up-down detection Hall elements (19) are disposed on a side of the movable plate (2) facing away from the up-down driving coils (12), and their positions correspond to hollow portions of the up-down driving coils (12).

4. The image sensor anti-shake apparatus according to claim 1, wherein the two up-down driving coils (12) are respectively disposed on left and right sides of one end of the movable plate (2), and the horizontal driving coil (13) is disposed in a middle part of another end of the movable plate (2);

the two up-down driving coils (12) are configured to move up and down synchronously relative to the two first up-down driving magnets (6) and the two second up-down driving magnets (15), so as to drive the movable plate (2) to move up and down;

or, the two up-down driving coils (12) are configured to o move relative to the corresponding first up-down driving magnets (6) and second up-down driving magnets (15) in a differential manner, thereby driving the movable plate (2) to rotate.

5. The image sensor anti-shake apparatus according to claim 1, wherein an attracting surface of the base (1) is provided with a plurality of ball grooves (7), balls (8) are installed in the ball grooves (7), and the balls (8) partially protrude from the attracting surface of the base (1), such that the base (1) and the movable plate (2) are isolated by the balls (8).

6. The image sensor anti-shake apparatus according to claim 1, wherein the connecting assembly comprises a first attracting magnet (5) disposed on an attracting surface of the base (1) and an iron piece (10) disposed on an attracting surface of the movable plate (2) at a position opposite to the first attracting magnet (5).

7. The image sensor anti-shake apparatus according to claim 1, wherein the cover plate (3) is provided with a second opening (17) at a position opposite to the image sensor module (21).

8. The image sensor anti-shake apparatus according to claim 2, wherein the movable plate (2) is a main control circuit board, and the horizontal driving coil (13), the up-down driving coils (12), the horizontal detection Hall element (23), the up-down detection Hall elements (19), and the gyroscope sensor (11) are all electrically connected to the main control circuit board; and the main control circuit board is connected to a control circuit board of an external imaging device via a flexible flat cable.

* * * * *